Sept. 25, 1923.
H. M. WOOD
1,469,202
RIM BRAKE FOR CYCLES AND THE LIKE VEHICLES
Filed Nov. 20, 1922   2 Sheets-Sheet 1
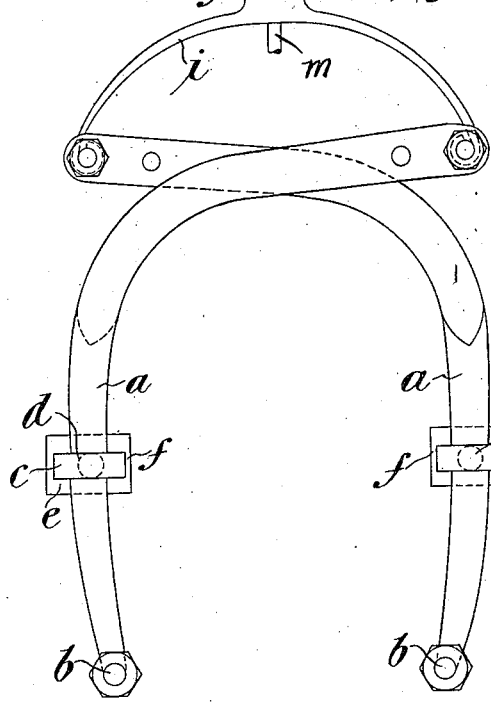
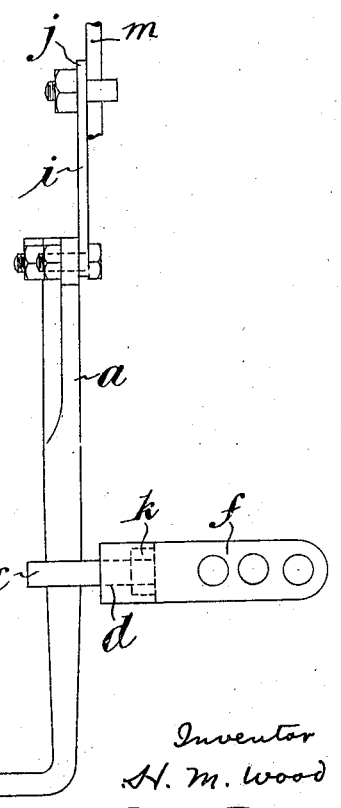
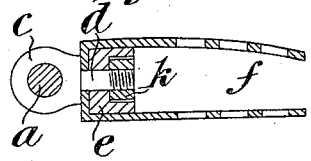
Inventor
H. M. Wood
By Robb Robb & Hill
attorneys Sept. 25, 1923.   1,469,202
H. M. WOOD
RIM BRAKE FOR CYCLES AND THE LIKE VEHICLES
Filed Nov. 20, 1922   2 Sheets-Sheet 2
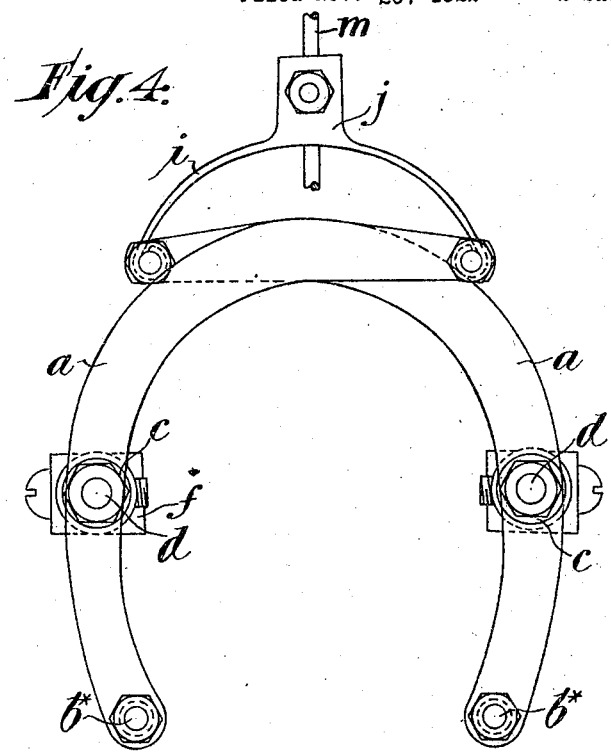
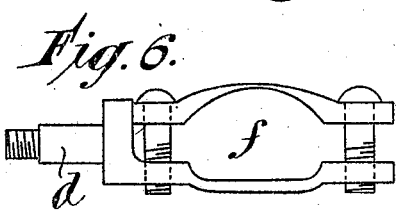
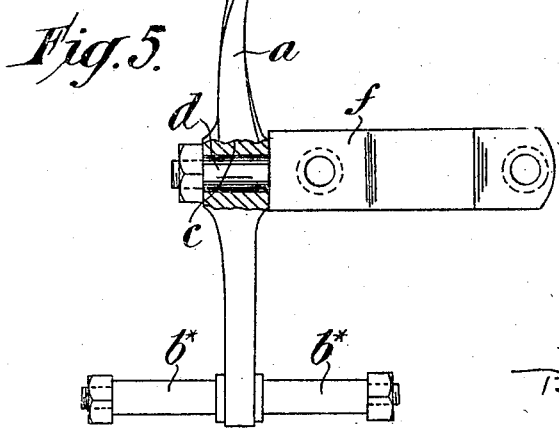
Inventor
H. M. Wood
By Robt. Robt. Hill
attorney Patented Sept. 25, 1923.

1,469,202

UNITED STATES PATENT OFFICE.

HARRY MOUNTFORD WOOD, OF MORDEN, ENGLAND.

RIM BRAKE FOR CYCLES AND THE LIKE VEHICLES.

Application filed November 20, 1922. Serial No. 602,155.

*To all whom it may concern:*

Be it known that I, HARRY MOUNTFORD WOOD, a subject of the King of Great Britain and Ireland, and a resident of Morden, county of Surrey, England, have invented a certain new and useful Improvement in Rim Brakes for Cycles and the like Vehicles, of which the following is a specification.

The present invention, which relates to improvements in rim brakes for cycles and the like vehicles, has for its object to provide a means which will, with a minimum of exertion on the part of the rider, enable a greater pressure to be applied to arrest the motion of the wheel rim.

The invention is characterized in that the arms or levers to which the brake blocks or pads are attached, each lever having unequal arms, are rotatable with or rotatable on fulcrums mounted in or carried by clips adapted to be fixed to the front or back forks, as the case may be, of the machine by bolts and nuts in the usual manner, means being provided to effect the simultaneous inward movement of the lower ends, and the outward movement of the upper ends of the arms aforesaid when braking.

In order that the invention may be the more readily understood, reference is to be had to the following description and accompanying sheets of drawings which illustrate practical embodiments of the invention.

Figure 1 is a front elevation of the brake; Figure 2 a side view thereof; Figure 3 a detailed section through the supporting fork; Figure 4 a front elevation of a modified form of the invention; Figure 5 a side view thereof with part in section; and Figure 6 a top plan of the supporting fork.

Like letters of reference indicate corresponding parts in the several figures.

In carrying out the invention, and referring first to Figures 1, 2 and 3 of the drawings, which are illustrative of the pivoting of the brake arms; *a, a* are the unequal levers or brake arms, to the lower ends *b* of which the brake blocks or pads are attached, and *c* are bosses in one with or fixedly secured to said arms *a*, said bosses *c* each being provided with or carrying a pivot pin *d* rotatable in the fork clip *f*.

The upper ends of the arms *a*, which cross each other over the wheel, are cut away, flattened, or otherwise shaped to allow of close fitting, and are connected by an arched or bow spring *i* with thickened or enlarged head *j* to receive the brake rod *m*, whilst the extremities of said spring *i* are pivotally connected to the upper ends of the brake arms *a*.

In this arrangement of brake, the pivots *d* of the bosses *c* of the arms *a* are pivotally mounted and secured by means of a nut *k* in a block *e* between the jaws of the clips *f*.

Referring now to Figures 4, 5 and 6, which are illustrative of the pivoting of the arms of the brake in accordance with a further embodiment of the invention, *a, a* are the brake arms, each of which by its boss *c* is pivotally mounted on the pin *d*, which is now fixedly attached to or formed in one with one of the jaws of the fork clip *f*, whilst, to obtain greater braking surface, the lower end of each arm *a* is now constituted by a pin *b* extending on each side of the arm *a*, each to receive a brake block or pad.

The upper ends of the arms *a* may be connected to the brake rod *m*, by means of a bow spring *i* as shown.

With the above described arrangement of brake, the upper ends of the arms *a* are, when pressure is applied to the brake lever or handlebar, drawn towards each other in an upward direction, causing the bottom ends *b*, to which the brake blocks or pads are fitted, to move inwards owing to the resistance of the fulcrums, and thus grip the cycle rim simultaneously on each side, whilst, owing to the great leverage obtained by the above described arrangements, much less pressure is required on the brake lever to steady or stop the cycle.

Further, the wheels can be taken out of the machine without removing any portion of the brake.

I claim:—

1. A rim brake of the character described comprising a pair of crossed brake levers, clamping means for fulcruming each lever upon a cycle frame, an arched spring pivotally connecting the upper ends of the brake levers, and a brake rod connected to said spring intermediate its ends for transmitting pressure to the brake levers through said spring.

2. A rim brake of the character described comprising a pair of crossed brake levers, a clamp device for each lever adapted to be secured to a cycle frame fork, a block disposed within said clamp, a pivotal connection comprising an eye secured to the lever and a pivot pin extended therefrom and secured in said block, actuating means for said levers, and a bow spring connected to said actuating means and pivoted at its ends to the upper ends of the levers for transmitting pressure to the levers in the application of the brake to the rim.

On testimony whereof I have affixed my signature hereto this 2nd day of November, 1922.

HARRY MOUNTFORD WOOD.